(12) United States Patent
Inagaki et al.

(10) Patent No.: US 7,756,144 B2
(45) Date of Patent: Jul. 13, 2010

(54) REDUCTION PROCESSING METHOD FOR PARALLEL COMPUTER, AND PARALLEL COMPUTER

(75) Inventors: Junichi Inagaki, Kawasaki (JP); Masao Koyabu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 968 days.

(21) Appl. No.: 11/472,987

(22) Filed: Jun. 23, 2006

(65) Prior Publication Data

US 2007/0220164 A1   Sep. 20, 2007

(30) Foreign Application Priority Data

Mar. 17, 2006  (JP) .............................. 2006-074971

(51) Int. Cl.
*H04L 12/56* (2006.01)
(52) U.S. Cl. .................... 370/401; 370/419; 370/463; 709/231
(58) Field of Classification Search ................ 370/400, 370/401, 419, 420, 463; 709/231, 250
See application file for complete search history.

(56) References Cited

U.S. PATENT DOCUMENTS

| | | | |
|---|---|---|---|
| 4,695,999 A | | 9/1987 | Lebizay |
| 4,918,686 A | * | 4/1990 | Hayashi et al. ............. 370/413 |
| 5,193,149 A | | 3/1993 | Awiszio et al. |
| 5,517,662 A | * | 5/1996 | Coleman et al. ............ 709/201 |
| 5,852,407 A | | 12/1998 | Ishi et al. |
| 6,126,331 A | | 10/2000 | Komatsu et al. |
| 6,223,242 B1 | * | 4/2001 | Sheafor et al. ............. 710/317 |
| 6,766,470 B1 | * | 7/2004 | Shah ............................ 714/9 |
| 7,032,062 B2 | * | 4/2006 | Aruga ....................... 710/316 |

FOREIGN PATENT DOCUMENTS

| | | |
|---|---|---|
| JP | 1-49983 | 10/1989 |
| JP | 7-295944 | 11/1995 |
| JP | 9-6737 | 1/1997 |
| JP | 9-330304 | 12/1997 |
| JP | 2889932 | 2/1999 |
| JP | 2000-20501 | 1/2000 |
| JP | 2001-325239 | 11/2001 |
| WO | 2006/020298 A | 2/2006 |

OTHER PUBLICATIONS

Japanese Office Action issued Jun. 16, 2009 in corresponding Japanese Patent Application 2006-074971.
European Search Report mailed Jun. 22, 2009 and issued in corresponding European Patent Application 06253428.4.

* cited by examiner

*Primary Examiner*—Pankaj Kumar
*Assistant Examiner*—Duc T Duong
(74) *Attorney, Agent, or Firm*—Staas & Halsey LLP

(57) ABSTRACT

A parallel computer operates to reduce data held by a plurality of nodes. Each node constituting a parallel computer transfers the data divided into n to other nodes, and each node summarizes the respective 1/n data and operates, then a plurality of nodes transfer the respective operation result to a summarizing node. Since all the nodes execute operation for divided data respectively, reduction processing time can be decreased. And more nodes (network adapters) can participate in data transfer through the first and second data transfers, high-speed transfer processing can therefore be implemented, and transfer time can be decreased.

20 Claims, 9 Drawing Sheets

| DESTINATION ADDRESS | TRANSMISSION SOURCE ADDRESS | FRAME TYPE | DATA | FRAME CHECKSUM |
|---|---|---|---|---|
| | | | | |

FIG. 6
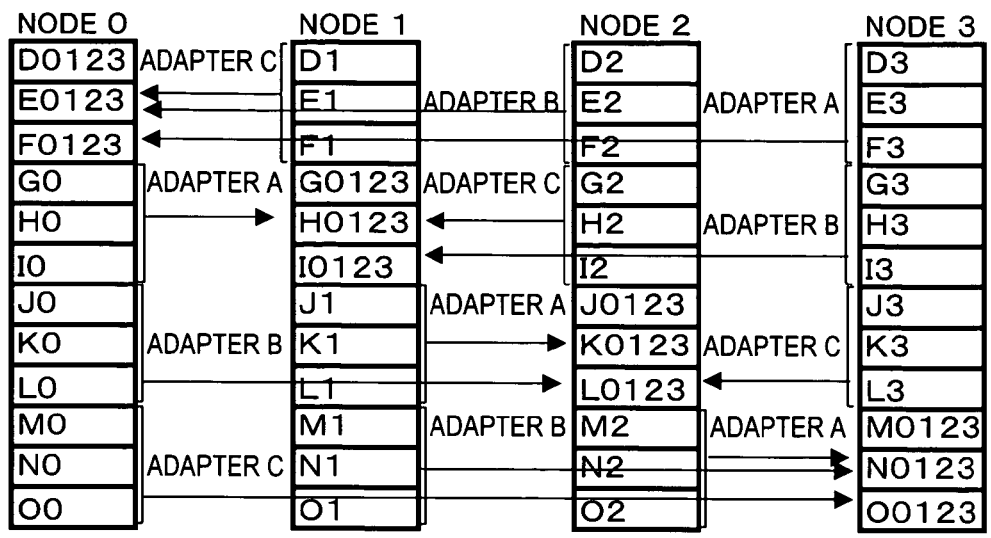
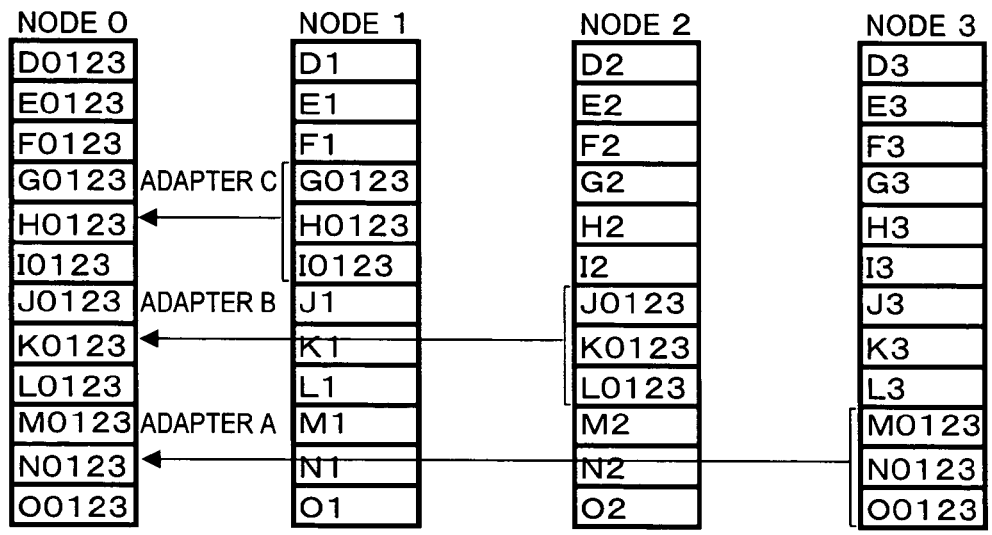

REDUCTION PROCESSING METHOD FOR PARALLEL COMPUTER, AND PARALLEL COMPUTER

CROSS-REFERENCE TO RELATED APPLICATIONS

This application is based upon and claims the benefit of priority from the prior Japanese Patent Application No. 2006-74971, filed on Mar. 17, 2006, the entire contents of which are incorporated herein by reference.

BACKGROUND OF THE INVENTION

1. Field of the Invention

The present invention relates to a reduction processing method for a parallel computer in which a plurality of computer nodes are connected via a network, wherein calculation results of the plurality of computer nodes are summarized and reduced, and to a parallel computer, and more particularly relates to a reduction processing method for a parallel computer for performing the reduction processing efficiently using a plurality of network adapters installed in each computer node, and to a parallel computer.

2. Description of the Related Art

As higher speeds of processing are demanded for computer systems, a parallel computer system, where a plurality of nodes including computers are installed and this plurality of nodes are connected via a network, is being provided. For example, in the field of parallel computers, data is computed in parallel by a plurality of nodes and the processed data is exchanged via a network. Such a parallel computer is comprised of several hundred to several thousand nodes if the scale becomes large.

In a parallel computer, the data of a plurality of nodes is collected and the specified operation is executed. This is called "reduction processing". Examples of reduction processing are an operation to determine the sum of the data of all the nodes, and an operation to determine a maximum value or minimum value of the data of all the nodes.

FIG. 11 and FIG. 12 are diagrams depicting the reduction processing of a conventional parallel computer. As FIG. 11 shows, a plurality of (4 in this case) nodes 100, 101, 102 and 103 are connected via a network, which is not illustrated. Each node 100, 101, 102 and 103 has a plurality (3 in this case) of network adapters 110A, 110B and 110C to enable parallel transfer. In FIG. 11, the reference numbers are assigned only to the network adapters of the node 100, but this is the same for other nodes 101, 102 and 103.

In order to collect the data of the plurality of nodes 100-103 and perform the specified operation (e.g. summation) of this configuration, the data of the node 101 is transferred from the node 101 to the node 100, the data of the node 103 is transferred from the node 103 to the node 102. And the node 100 executes the operation for the data of the node 100 and node 101, and the node 102 executes the operation for the data of the node 102 and node 103 respectively. Then the operation result of the node 102 is transferred to the node 100, and the node 100 executes the operation for the data of the node 100 and the data of the node 102.

This will be described using the example of the 12 blocks shown in FIG. 12. In FIG. 12, D0, D1, D2 and D3 are the data which each node 100, 101, 102 and 103 has, and D01 and D23 are the operation result of the data of the nodes 100 and 101, and the operation result of the data of nodes 102 and 103 respectively, and D0123 is the operation result of the nodes 100-103.

As FIG. 12 shows, 12 blocks of data which each node 100-103 has are divided into 3, and the data operation results D1-O1 and D3-O3 are transferred from the node 101 and 103 to the nodes 100 and 102 using three network adapters 110A, 110B and 110C. For the nodes 100 and 102, the data operation results D01-O01 of the nodes 100 and 101, and the data operation results D23-O23 of the nodes 102 and 103 are operated.

Then the operation results D23-O23 are transferred from the node 102 to the node 100. The node 100 operates the operation results D0123-O0123 of the nodes 100-103 from the operation results D01-O01 and the operation results D23-O23.

In this way, according to the prior art, each of the nodes 100, 101, 102 and 103 has a plurality of network adapters, so that the time required for reduction processing is decreased by parallel transfer (e.g. Japanese Patent Application Laid-Open No. 2001-325239).

However with the prior art, two nodes execute the operation after the first transfer, and the other two nodes only transfer data and do not execute the operation. Therefore the nodes which execute the operation are limited, and increasing the speed of reduction processing is difficult.

SUMMARY OF THE INVENTION

With the foregoing in view, it is an object of the present invention to provide a reduction processing method for a parallel computer, for increasing the speed of reduction processing by collecting the data of many nodes, and the parallel computer.

It is another object of the present invention to provide a reduction processing method for a parallel computer for increasing the speed of reduction processing by letting many nodes participate in the operation of the reduction processing, and the parallel computer.

It is still another object of the present invention to provide a reduction processing method for a parallel computer for improving the capability of parallel computing by increasing the speed of reduction processing.

To achieve the above objects, the present invention provides a parallel computer having three or more nodes, each of which has a plurality of network adapters, and cross bar switches for connecting the network adapters of each of the nodes. And each of the nodes divides data being held into a plurality of data and transfers the divided data to a plurality of other nodes via different network adapters respectively, and each of the nodes executes a reduction operation of the received divided data and the data being held, and the plurality of nodes transfer the reduction operation result to at least one of the nodes via the network adapters for summarizing the data.

Also the present invention provides a reduction processing method for a parallel computer for summarizing the data being held by a plurality of nodes each of which has a plurality of network adapters, and reducing the data, having a step of each of the nodes dividing the data being held into a plurality of data, a step of each of the nodes transferring the divided data to a plurality of other nodes via different network adapters respectively, a step of each of the nodes executing a reduction operation of the received divided data and data being held, and a step of the plurality of nodes transferring the reduction operation result to at least one of the nodes via the network adapters for summarizing the data.

In the present invention, it is preferable that each of the nodes divides the data being held into a plurality of data, and transfers the divided data, other than the data to be executed reduction operation by this node itself, to a plurality of other nodes via different network adapters respectively.

In the present invention, it is preferable that the plurality of nodes transfer the reduction operation result to the plurality of other nodes via the network adapters.

Also in the present invention, it is preferable that each of the nodes divides the data to be execute reduction operation by a divisor according to the number of network adapters to create the divided data.

Also in the present invention, it is preferable that each of the nodes transfers the divided data to the plurality of nodes of which number is the same as the number of network adapters.

Also in the present invention, it is preferable that each of the nodes divides the data by a divisor which is the number of the network adapters +1 to create the divided data.

Also in the present invention, it is preferable that each of the nodes transfers the divided data to other nodes via a predetermined network adapter so that the use of the network adapters does not overlap between the plurality of nodes.

Also in the present invention, it is preferable that each of the network adapters is connected to the cross bar switch via a network.

Also in the present invention, it is preferable that each of the nodes has at least a CPU, a memory and a plurality of network adapters.

Also in the present invention, it is preferable that within each node group obtained by grouping the plurality of nodes into a plurality of node groups, each of the nodes divides the data being held into a plurality of data, and transfers the divided data to a plurality of other nodes in the node group, each node in the node group executes a reduction operation of the received divided data and the data being held, the plurality of nodes transfer the reduction operation result to at least one of the nodes, the reduction operation result is summarized, each of the nodes which summarized the data divides the data into a plurality of data, and transfers the divided data to other plurality of nodes which summarized the data, each of the nodes which summarized the data executes the reduction operation of the received divided data and the data being held, and the plurality of nodes which summarized the data transfer the reduction operation result to at least one of the nodes which summarized the data, to summarize the resolution operation result among the node groups.

According to the present invention, each node transfers the data divided into n to other nodes, and each node summarizes the respective 1/n data, and operates, then each node summarizes the respective operation result and transfers it to a summarizing node. Since all the nodes execute operation for the divided data respectively, the reduction processing time can be decreased. And more nodes (network adapters) can participate in data transfer through the first and second data transfers, high-speed transfer processing can be implemented, and transfer time can be decreased.

BRIEF DESCRIPTION OF THE DRAWINGS

FIG. 6 is a diagram depicting the data flow according to the first embodiment in FIG. 5;

DESCRIPTION OF THE PREFERRED EMBODIMENTS

Embodiments of the present invention will now be described in the sequence of configuration of parallel computer, first embodiment, second embodiment, third embodiment and other embodiments, but the present invention shall not be limited to these embodiments.

Configuration of Parallel Computer

Figure 1:
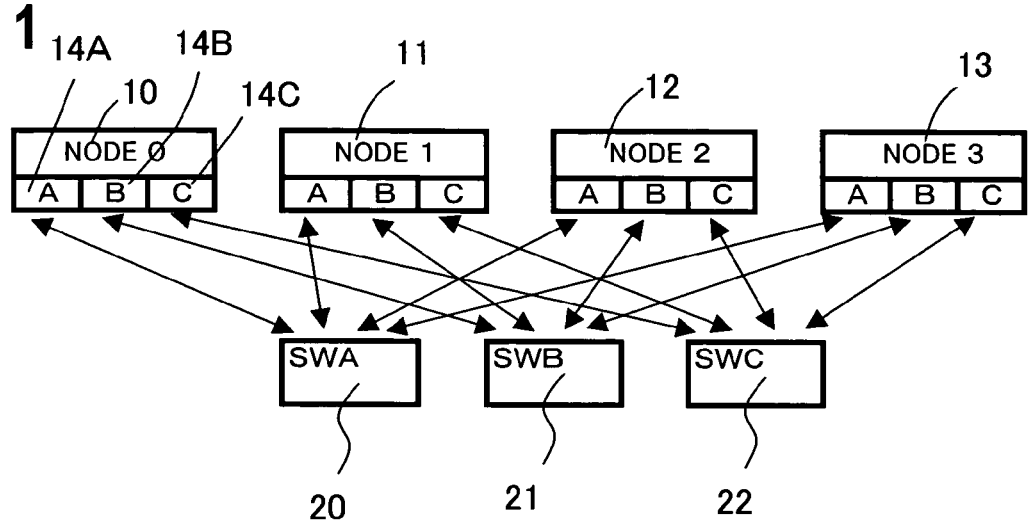
FIG. 1 is a block diagram depicting a parallel computer according to an embodiment of the present invention.
Figure 2:
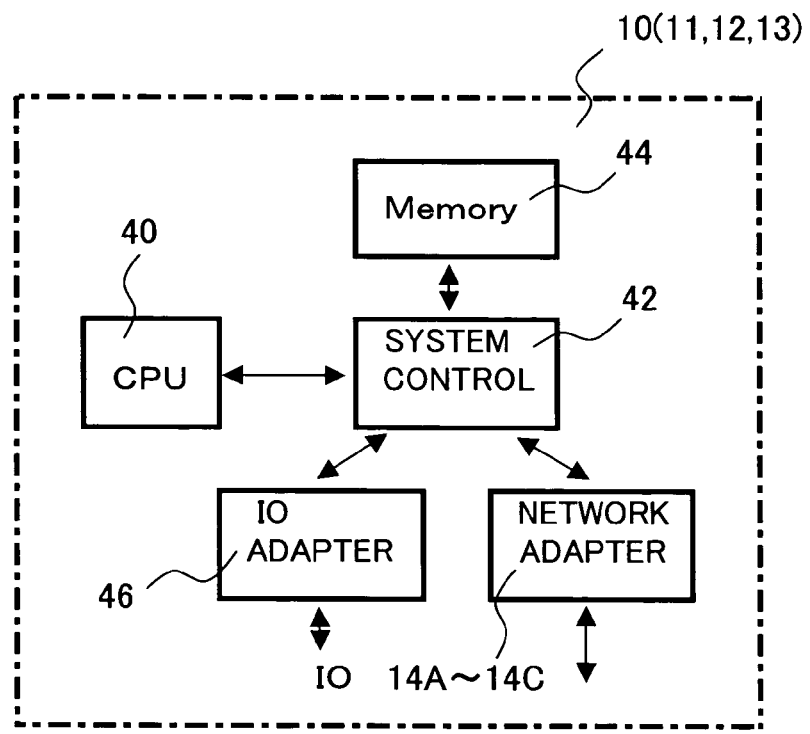
FIG. 2 is a block diagram depicting the node in FIG. 1.
Figures 3, 4:
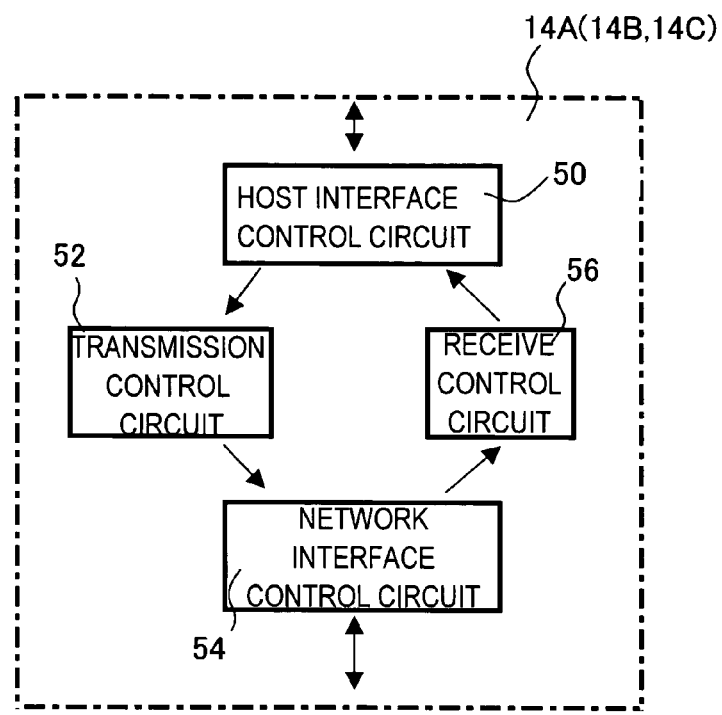
FIG. 3 is a block diagram depicting the network adapter in FIG. 1 and FIG. 2.
FIG. 4 shows a format of the transmission frame in FIG. 1.

FIG. 1 is a block diagram depicting an embodiment of a parallel computer according to the present invention, FIG. 2 is a block diagram depicting the node in FIG. 1, FIG. 3 is a block diagram depicting the network adapter in FIG. 1, and FIG. 4 shows a format of the frame of the transfer data in FIG. 1.

As FIG. 1 shows, the parallel computer has a plurality (4 in this case) of nodes 10, 11, 12 and 13, and three cross bar switches (SWA, SWB and SWC in FIG. 1) 20, 21 and 22. Each node 10, 11, 12 and 13 has three network adapters (A, B and C in FIG. 1) 14A, 14B and 14C. The network adapters 14A, 14B and 14C of each node 10, 11, 12 and 13 communicate with each other via each cross bar switch 20, 21 and 22. In other words, the network adapters 14A, 14B and 14C of each node 10, 11, 12 and 13 are connected to the cross bar switches 20, 21 and 22 respectively via a transmission path, such as Ethernet (Registered Trade mark).

The node 10 (11, 12, 13) of a computer where a CPU 40, a memory 44, and IO adapter 46 and the above mentioned network adapters 14A-14C are connected via a system controller 42, as shown in FIG. 2. A plurality of CPUs 40, memories 44, IO adapters 46 and network adapters 14A-14C may be installed according to the processing capability required for the node.

The network adapter 14A (14B, 14C) in FIG. 1 and FIG. 2 is comprised of a host interface control circuit 50 which is connected to a system controller 42, a transmission control circuit 52, a network interface control circuit 54 which is connected to a transmission path, and a receive control circuit 56, as shown in FIG. 3. This network adaptor 14A (14B, 14C) is in-charge of the data communication between the nodes.

When data is transferred between nodes via the network adapters 14A (14B, 14C), the data is communicated in the frame format shown in FIG. 4. The frame format in FIG. 4 shows the frame format used for Ethernet (Registered Trade mark), which is comprised of a destination address, transmission source address, frame type (e.g. command type, data size), data and frame checksum (e.g. CRC (Cyclic Redundancy Code)). The data length (data size) of the data area is variable, and data which is transferred between nodes is divided into a plurality of frames if necessary, and is transferred.

First Embodiment

Figure 5:
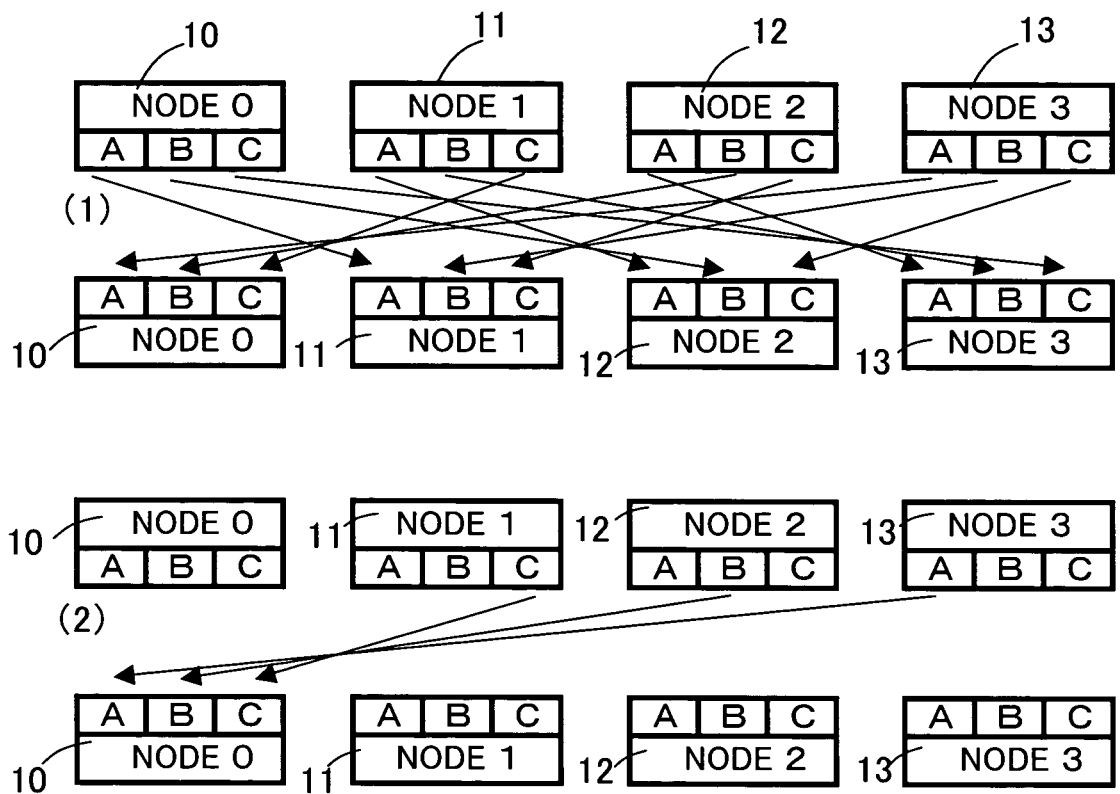
FIG. 5 is a diagram depicting the reduction processing according to the first embodiment of the present invention.
Figure 7:
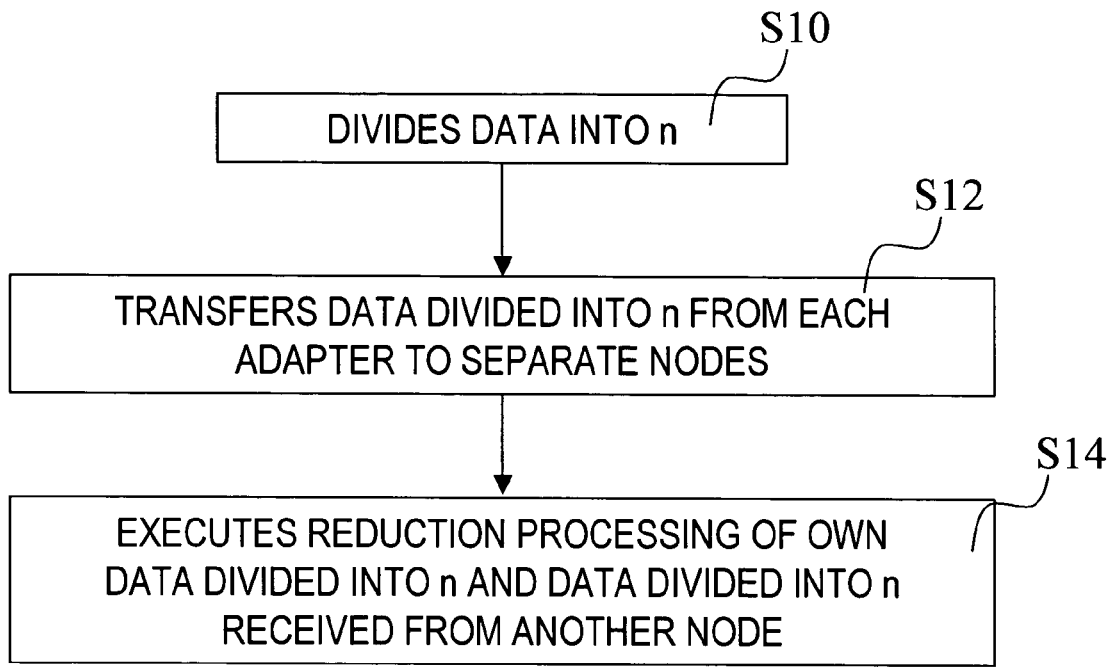
FIG. 7 is a flow chart depicting the transfer/operation processing of the node according to the first embodiment in FIG. 5.
Figure 8:
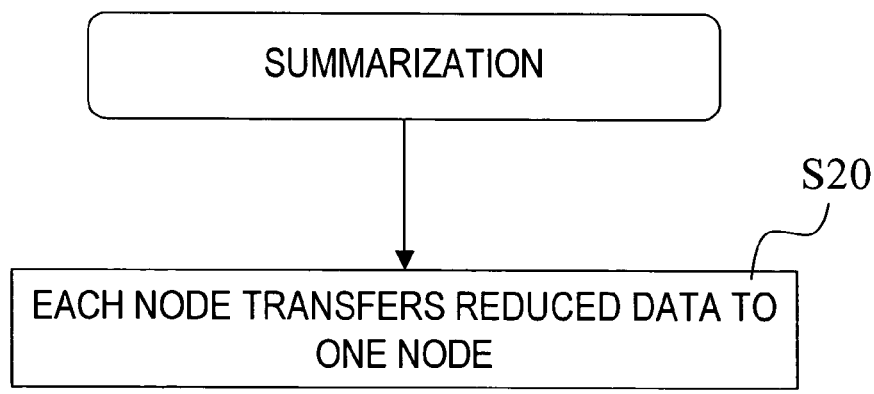
FIG. 8 is a flow chart depicting the transfer/summarization processing of the node according to the first embodiment in FIG. 5.

FIG. 5 is a diagram depicting the first embodiment of the reduction processing of the present invention, FIG. 6 is a diagram depicting the data flow of the reduction processing in FIG. 5, FIG. 7 is a flow chart depicting the transfer/operation processing of the node in FIG. 5, and FIG. 8 is a flow chart depicting the summarization processing of the node in FIG. 5.

As FIG. 5 shows, each node 10, 11, 12 and 13 divides the data blocks to be reduced to n, and transfers them to each node 10, 11, 12 and 13 via separate network adapters 14A, 14B and 14C. The nodes 10, 11, 12 and 13 which received the data summarizes the respective 1/n data and operates as shown sign (1). Then each node 11, 12 and 13 transfers the respective operation result to the node 10, and the node 10 summarizes the received result and the result which the node 10 itself operated as shown sign (2).

Figure 12:
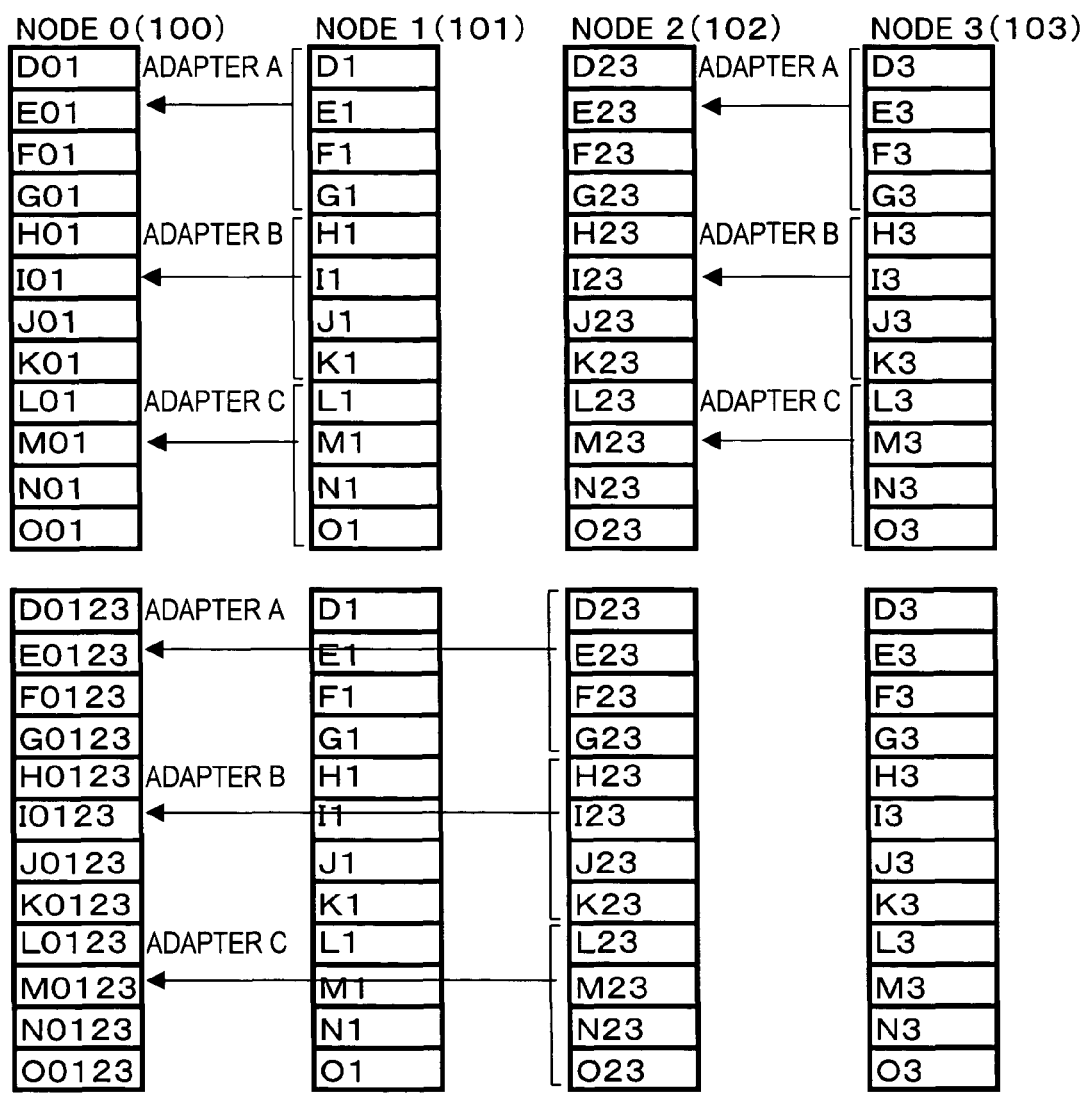
FIG. 12 is a diagram depicting the data flow in FIG. 11.

This will be described using an example of the same data volume as FIG. 12, with reference to FIG. 6. In these figures, D0-D3, E0-E3, . . . , and O0-O3 are 12 blocks of data that each node 10, 11, 12 and 13 has, and D0123-O0123 show the reduction processing operation result.

As FIG. 6 shows, the 12 blocks of data D0-O0, D1-O1, D2-O2 and D3-O3 that each node 10-13 has are divided into four. Each node 10, 11, 12 and 13 transfers three data groups of the data groups divided into four to a different node 10, 11, 12 and 13 using the three network adapters 14A, 14B and 14C.

For example, the node 10 transfers the data G0-I0, J0-L0 and M0-O0 out of the 12 blocks of the data D0-O0 to the node 11, 12 and 13 respectively. In the same way, the node 11 transfers the data D1-F1, J1-L1 and M1-O1 out of the 12 blocks of the data D1-O1 to the nodes 10, 12 and 13 respectively. The node 12 transfers the data D2-F2, G2-I2 and M2-O2 out of the 12 blocks of the data D2-O2 to the nodes 10, 11 and 13 respectively. The node 13 transfers the data D3-F3, G3-I3 and J3-L3 out of the 12 blocks of the data D3-O3 to the nodes 10, 11 and 12 respectively.

Therefore the node 10 summarizes the data D0-F0, data D1-F1, data D2-F2 and data D3-F3, the node 11 summarizes the data G0-I0, data G1-I1, data G2-I2 and data G3-I3, the node 12 summarizes the data J0-L0, data J1-L1, data J2-L2 and data J3-L3, and the node 13 summarizes the data M0-O0, data M1-O1, data M2-O2 and data M3-03.

The node 10 summarizes the data D0-F0, data D1-F1, data D2-F2 and data D3-F3, and operates (e.g. summarizes) and acquires the operation result D0123-F0123. In the same way, the node 11 summarizes the data G0-I0, data G1-I1, data G2-I2, and data G3-I3, and operates (e.g. summarizes) and acquires the operation result G0123-I0123. The node 12 summarizes the data J0-L0, data J1-L1, data J2-L2, and data J3-L3, and operates (e.g. summarizes) and acquires the operation result J0123-L0123. The node 13 summarizes the data M0-O0, data M1-O1, data M2-O2, and data M3-O3, operates (e.g. summarizes) and acquires the operation result M0123-O0123.

Then the result of operation in each node is summarized in the node 10. In other words, the operation results G0123-I0123, J0123-L0123 and M0123-O0123 are transferred from the network adapters 14A, 14B and 14C of each node 11, 12 and 13 to the node 10.

In this way, each node 10, 11, 12 and 13 transfers three data out of the data divided into four to other nodes, and each node summarizes the respective quarter data and operates. Then each node 11, 12 and 13 transfers the respective operation result to the node 10.

In other words, if the operation contents of reduction processing is the same for the prior art and the present invention, the operation volume is the same. In the case of prior art, the nodes 10 and 12 actually execute operation, and the nodes 11 and 13 only transfer the data. In the present invention, however, all the nodes execute the operation of the divided data respectively, so processing ends faster if the entire calculation volume is the same.

Also in the present invention, more nodes (network adapters) participate in the data transfer through the first and second data transfers, so high-speed transfer processing can be implemented, and transfer time can be decreased.

For example, comparing the transfer time with respect to the total transfer volume of the entire network between the prior art and the present embodiment, the transfer time is the total transfer volume÷3×2=⅔ in the case of the prior art, but the total transfer volume÷4×2=½ in the case of the present embodiment. Therefore in the present embodiment, data transfer can be performed at ¾ time of the prior art.

In the present embodiment, in the first and second transfers, the data is transferred only once since the connection relationship of the transmission network adapter and the receive network adapter is selected such that an overlap is avoided.

FIG. 7 is a processing flow chart of each node.

(S10) The CPU 40 of each node 10, 11, 12 and 13 divides the data block to be reduced into a plurality (4 in the case of FIG. 6) of data. If this divisor is the same number as the number of transfer destination nodes or the number of network adapters, the effect of the above mentioned reduction operation processing can be expressed to the maximum.

(S12) Then the CPU 40 of the nodes 10, 11, 12 and 13 instructs the network adapters 14A, 14B and 14C to transfer the divided data blocks (3 blocks in the case of FIG. 6) to different nodes 10, 11, 12 and 13. By this, the network adapters 14A, 14B and 14C of the nodes 10, 11, 12 and 13 transfer the divided data blocks to the network adapters 14A, 14B and 14C of the nodes 10, 11, 12 and 13.

(S14) The CPU 40 of each node 10, 11, 12 and 13 performs reduction operation processing on the data which was not transferred and data received from another node, and acquires the operation result.

FIG. 8 is a flow chart of the summarization processing of the node.

(S20) Each node 11, 12 and 13 transfers the operation result to the node 10 with the summarizing node 10 being a destination.

In this way, the CPU 40 of each node 10, 11, 12 and 13 executes the data division, transfer and operation processing in parallel, so reduction processing time can be easily decreased.

Second Embodiment

Figure 9:
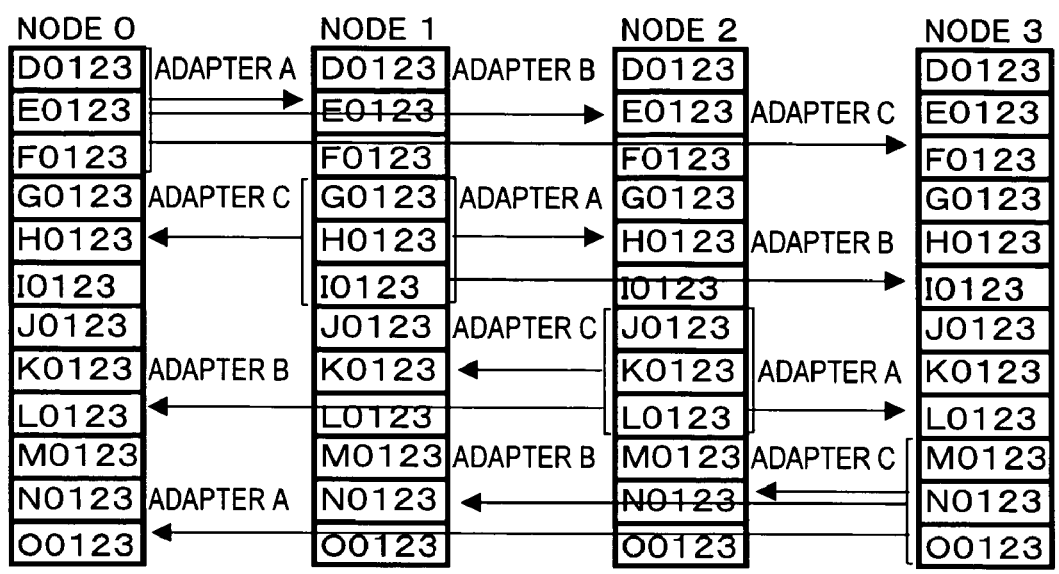
FIG. 9 is a diagram depicting the reduction processing according to the second embodiment of the present invention.

FIG. 9 is a diagram depicting the second embodiment of the reduction processing of the second embodiment of the present invention. In the first embodiment, the operation result is summarized by one summarization node 10, but in some cases other nodes must know the operation result. In the case of the present embodiment, all the nodes acquire the operation result in the second data transfer, so all the nodes can share the operation result.

FIG. 9 shows the second data transfer in FIG. 6, and the first transfer/operation processing is the same as FIG. 6.

As FIG. 9 shows, the result of operation at each node is transferred to each node 10, 11, 12 and 13 in the second transfer. In other words, the operation results G0123-I0123, J0123-L0123, and M0123-O0123 are transferred from the network adapters 14A, 14B and 14C of each node 10, 11, 12 and 13 to the nodes 10, 11, 12 and 13.

In this example as well, each node 10, 11, 12 and 13 transfers three data out of the data divided into four to other nodes, and each node summarizes the respective quarter data and operates. Then all the nodes 10, 11, 12 and 13 transfer the respective operation results to all the nodes 10, 11, 12 and 13.

In other words, in the first embodiment, all the network adapters of the node 10, the network adapters 14A and 14B of the node 11, the network adapters 14A and 14C of the node 12, and the network adapters 14B and 14C of the node 13 are not used, so in the second embodiment, these network adapters are used, and data transfer is performed to share the operation result.

Third Embodiment

Figure 10:
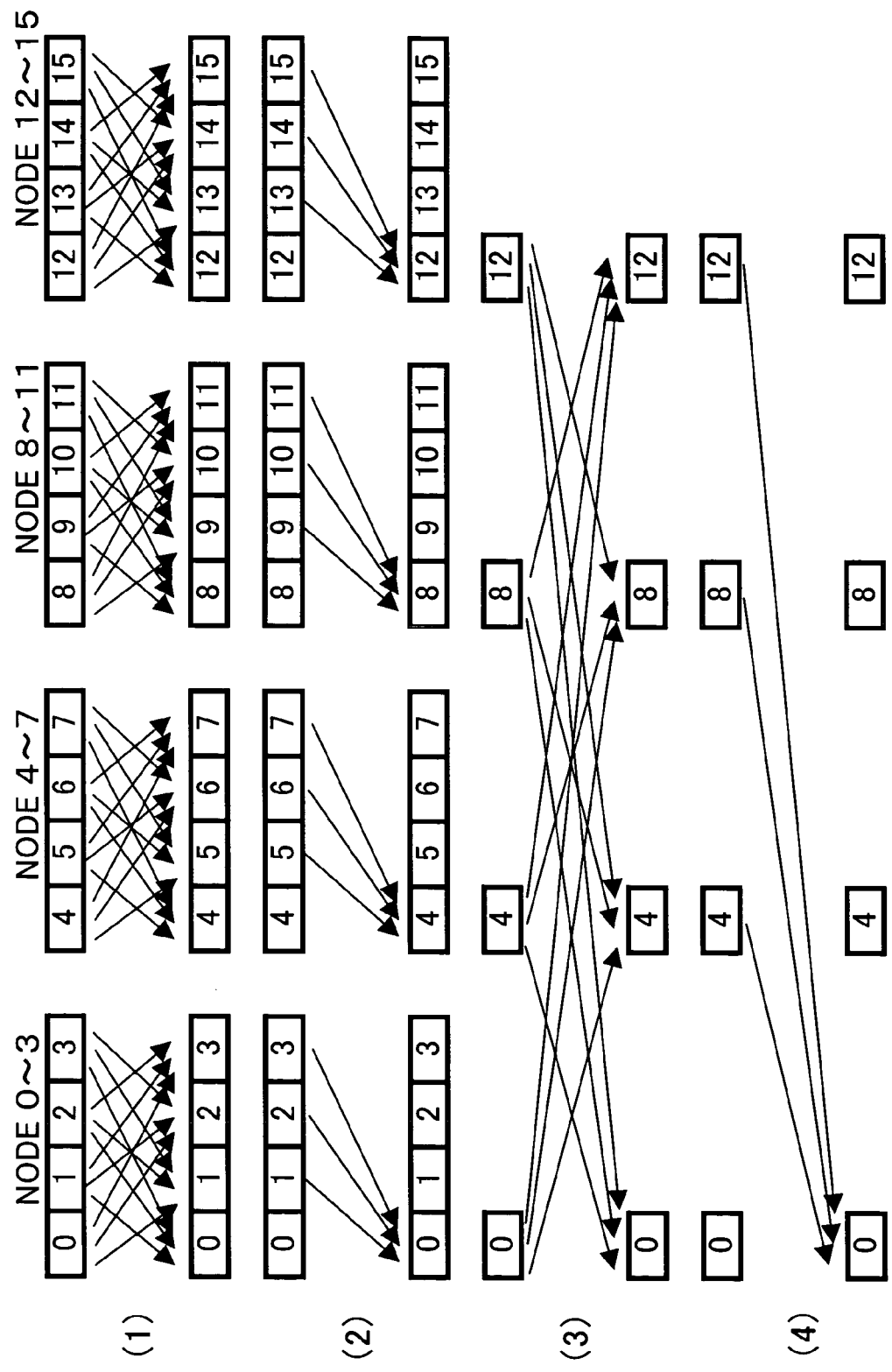
FIG. 10 is a diagram depicting the reduction processing according to the third embodiment of the present invention.
Figure 11:
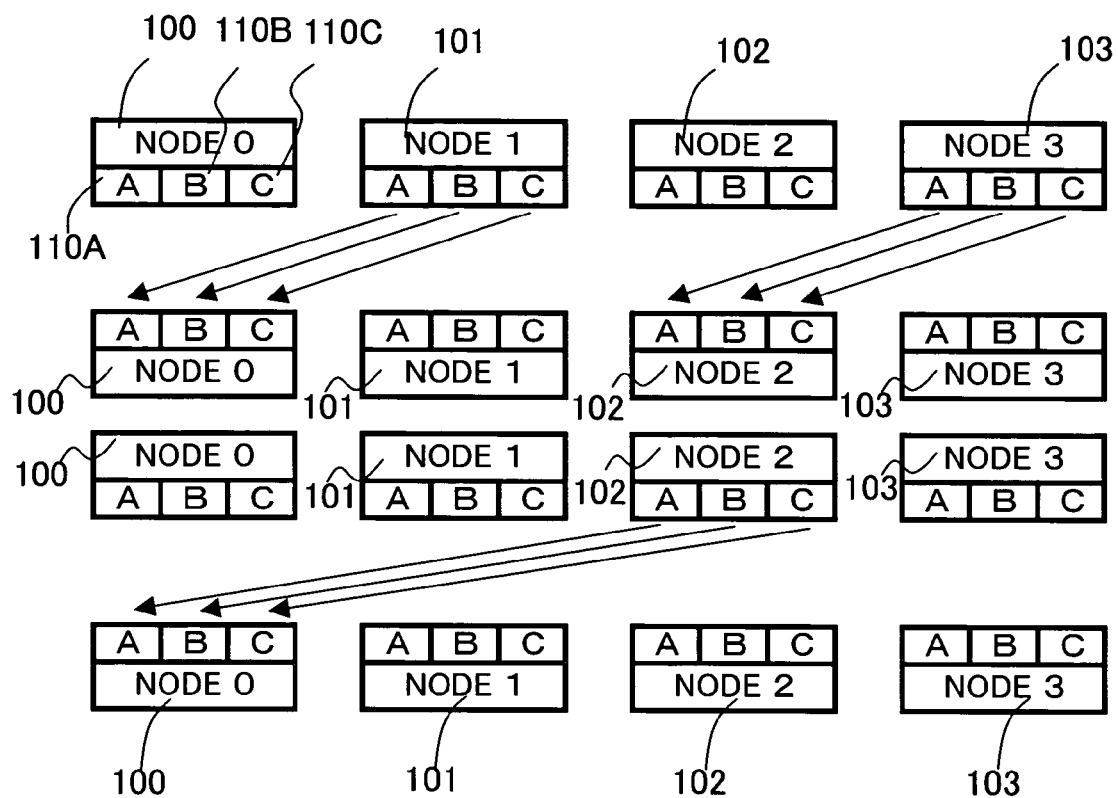
FIG. 11 is a diagram depicting the reduction processing according to the prior art.

FIG. 10 is a diagram depicting the broadcast processing according to the third embodiment of the present invention. In this example, a parallel computer has 16 nodes, 0-15, each of which network adapter has 3 network adapters, wherein the reduction processing for the nodes 0-15 is performed. In FIG. 10, nodes the same as those in FIG. 1 and FIG. 5 are denoted with the same serial numbers.

First 16 nodes are divided into 4 node groups, 0-3, 4-7, 8-11 and 12-15, and processing the same as the first embodiment is executed for each node group.

In other words, within each node groups 0-3, 4-7, 8-11 and 12-15, the nodes 0-3, 4-7, 8-11 and 12-15 divide the data to be reduced into n, and transfer the data to each node 0-3, 4-7, 8-11 and 12-15 in the group via separate network adapters 14A, 14B and 14C. The nodes 0-3, 4-7, 8-11 and 12-15 which received the data summarizes the respective 1/n data, and operates as shown sign (1). Then each node 1-3, 5-7, 9-11 and 13-15 transfers the result of the operation executed by the node itself to the nodes 0, 4, 8, and 12, and each of the nodes 0, 4, 8 and 12 summarizes the received result and the result of the operation executed by the node itself as shown sign (2).

Then the nodes 0, 4, 8 and 12 which summarized the data in each group divides the data to be reduced into n, and transfers it to each node 0, 4, 8 and 12 via separate network adapters 14A, 14B and 14C, just like the case of the first embodiment. The nodes 0, 4, 8 and 12 which received the data summarize the respective 1/n data, and operates as shown sign (3). Then each of the nodes 4, 8 and 12 transfers the result of the calculation performed by the node itself to the node 0, and the node 0 summarizes the received result and the result of the operation executed by the node 0 itself as shown sign (4).

In this way, by repeating the processing of the first embodiment, the reduction processing can be executed in the same way, even if the number of nodes increases. In other words, when the first embodiment is executed in two stages, a maximum of 16 nodes can be supported, and when executed in three stages, a maximum of 64 nodes can be supported. By increasing the stages, an increase in the number of nodes can be supported.

In this way, the maximum number of nodes that can execute reduction processing one time is the number of network adapters +1, and when the number of nodes further increase, the number of nodes that can execute reduction processing can be increased by performing two processing in the second stage and third stage.

Other Embodiments

In the above embodiments, a parallel computer having 4 nodes was used for description, but the present invention can be applied to a parallel computer having 3 nodes or more. The configuration of the node was described using a computer unit comprised of a CPU, memory, etc. but other computer configurations may be used. The format of a transmission path is not limited to Ethernet (Registered Trade mark), but other network protocols can be used.

Each node constituting a parallel computer transfers the data divided into n to other nodes, and each node summarizes the respective 1/n data, and operates, then each of a plurality of nodes transfers it to a summarizing node. Since all the nodes execute the operation of the respective divided data, processing ends quicker. And more nodes (network adapters) can participate in data transfer through the first and second data transfers, high-speed transfer processing can be implemented, and transfer time can be decreased.

What is claimed is:

1. A parallel computer comprising:
   three or more nodes each of which has a plurality of network adapters; and
   cross bar switches for connecting the network adapters of each of said nodes,
   wherein each of said nodes divides data being held into a plurality of data and transfers said divided data to a plurality of other nodes via different network adapters respectively,
   and each of said nodes executes a reduction operation of said received divided data and the data being held,
   and said plurality of nodes transfer the corresponding reduction operation result to at least one of said nodes via said network adapter for summarizing the data.

2. The parallel computer according to claim 1, wherein each of said nodes divides the data being held into a plurality of data and transfers the divided data, other than the data to be executed reduction process by this node itself, to a plurality of other nodes via different network adapters respectively.

3. The parallel computer according to claim 1, wherein said plurality of nodes transfer the reduction operation result to a plurality of other nodes via said network adapters.

4. The parallel computer according to claim 1, wherein each of said nodes divides the data to be reduced by a divisor according to the number of said network adapters and creates said divided data.

5. The parallel computer according to claim 1, wherein each of said nodes transfers said divided data to said plurality of nodes, the number of which is the same as the number of said network adapters.

6. The parallel computer according to claim 4, wherein each of said nodes divides the data by a divisor which is the number of said network adapters +1 to create said divided data.

7. The parallel computer according to claim 1, wherein each of said nodes transfers said divided data to other nodes via a predetermined network adapter so that the use of said network adapters does not overlap between said plurality of nodes.

8. The parallel computer according to claim 1, wherein each of said network adapters is connected to said cross bar switch via a network.

9. The parallel computer according to claim 1, wherein each of said nodes comprises:

at least a CPU;
a memory; and
said plurality of network adapters.

10. A parallel computer according to claim 1, wherein within each node group obtained by grouping said plurality of nodes into a plurality of node groups, each of said nodes divides data being held into a plurality of data, and transfers said divided data to a plurality of other nodes in said node group, and each node in said node group executes a reduction operation of said received divided data and the data being held, and said plurality of nodes transfer the reduction operation result to at least one of said nodes to summarize the reduction operation result, and each of said nodes which summarized the data divides the data into a plurality of data and transfers said divided data to said other plurality of nodes which summarized the data, and each of said nodes which summarized the data executes a reduction operation of said received divided data and data being held, and said plurality of nodes which summarized the data transfer the reduction operation result to at least one of said nodes which summarized the data, to summarize the reduction operation results among the node groups.

11. A reduction processing method for a parallel computer for summarizing data being held by a plurality of nodes each of which has a plurality of network adapters and reducing the data, comprising the steps of:

dividing the data being held into a plurality of data at each of said nodes;

transferring said divided data to a plurality of other nodes via different network adapters of each of said nodes respectively;

executing a reduction operation of said received divided data and the data being held at each of said nodes;

transferring the corresponding reduction operation result from said nodes to at least one of said nodes via said network adapter; and summarizing the data at said transferred one node.

12. The reduction processing method for a parallel computer according to claim 11, wherein said transfer divided date step comprises a step of transferring the divided data, other than the data to be reduced by this node itself, to a plurality of other nodes via different network adapters respectively.

13. The reduction processing method for a parallel computer according to claim 11, wherein said step of transferring said reduction result comprises a step of transferring the reduction operation result to said plurality of other nodes via said network adapters.

14. The reduction processing method for a parallel computer according to claim 11, wherein said dividing step comprises:

a step of dividing the data to be reduced by a divisor according to the number of said network adapters; and a step of creating said divided data.

15. The reduction processing method for a parallel computer according to claim 11, wherein said step of transferring divided data further comprises a step of transferring said divided data to said plurality of nodes, the number of which is the same as the number of said network adapters.

16. The reduction processing method for a parallel computer according to claim 14, wherein said dividing step further comprises a step of dividing the data by a divisor which is the number of said network adapters +1 to create said divided data.

17. The reduction processing method for a parallel computer according to claim 11, wherein said transferring step further comprises a step of transferring said received divided data to another node via a predetermined network adapter so that the use of said network adapters does not overlap between said plurality of nodes.

18. The reduction processing method for a parallel computer according to claim 11, wherein each of said network adapters is connected to said cross bar switch via a network.

19. The reduction processing method for a parallel computer according to claim 11, wherein each of said nodes comprises at least a CPU, a memory and said plurality of network adapters.

20. The reduction processing method for a parallel computer according to claim 11, further comprising:

a step of executing said dividing step, said transferring step, said operating step and said summarizing step within each node group obtained by grouping said plurality of nodes into a plurality of node groups; and a step of executing said dividing step, said transferring step, said operating step and said summarizing step by means of said plurality of nodes which summarized the data.

* * * * *